United States Patent Office 3,313,699
Patented Apr. 11, 1967

3,313,699
COMPOSITIONS FOR AND METHOD OF TREATING THE CENTRAL NERVOUS SYSTEM
Charles D. Bossinger, Olympia Fields, and Kelley G. Taylor, Decatur, Ill., assignors to Armour Pharmaceutical Company, Chicago, Ill., a corporation of Delaware
No Drawing. Original application June 26, 1962, Ser. No. 205,199, now Patent No. 3,265,727, dated Aug. 9, 1966. Divided and this application June 6, 1966, Ser. No. 555,259
13 Claims. (Cl. 167—65)

This invention relates to compositions for and methods of treating the central nervous system of animals, that is, mammals and fowls, especially man and domestic animals. More particularly, this invention relates to the treatment of animals to provide muscle relaxation by administering to these animals special compositions containing, as an essential active ingredient, novel compounds which can be classified generally as phenyl alkyl dicarbamates.

This application is a divisional application from co-pending application Ser. No. 205,199, filed June 26, 1962, now U.S. Patent No. 3,265,727, granted Aug. 9, 1966, which in turn is a continuation-in-part of copending application Ser. No. 729,554, filed Apr. 21, 1958, and of Ser. No. 38,763, filed June 27, 1960. Application Ser. No. 38,763 was a continuation-in-part of application Ser. No. 729,553, filed Apr. 21, 1958, and applications Ser. Nos. 729,553 and 729,554 were continuations-in-part of parent application Ser. No. 554,132, filed Dec. 20, 1955. Applications Ser. Nos. 38,763, 729,553 and 554,132 are now abandoned.

It is an object of this invention to provide carbamate compounds for use in treating the central system. More specifically, it is an object to provide carbamate compounds which exhibit special and distinctive properties, or combinations of properties in the treatment of the central nervous system. For example, it is an object to provide carbamate compounds which when administered to an animal as defined will function primarily as a muscle relaxant, and which will exhibit relatively little sedative effect. Further objects and advantages will be indicated in the following detailed specification.

The phenyl alkyl dicarbamate compounds which are useful in the treatment of the central nervous system to provide muscle relaxation in accordance with the present invention are characterized by the following structural formula:

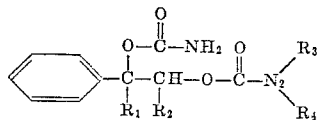

In the foregoing formula, $R_1$ is either hydrogen or an alkyl group containing from 1 to 3 carbon atoms, $R_2$ is either hydrogen or an alkyl group containing from 1 to 2 carbon atoms; and $R_3$ and $R_4$ are either hydrogen or methyl. For one preferred sub-class of compounds $R_1$ is hydrogen, $R_2$ is hydrogen or an alkyl group containing from 1 to 3 carbon atoms, and $R_3$ and $R_4$ are hydrogen.

Examples of such preferred compounds are 1-phenyl ethyl-1,2-dicarbamate, 1-phenyl propyl-1,2-dicarbamate and 1-phenyl butyl-1,2-dicarbamate. Other compounds coming within the scope of the present invention are 2-phenyl propyl-1,2-dicarbamate, 2-phenyl butyl-1,2-dicarbamate, 2-phenyl butyl-1,2-dicarbamate, 2-phenyl butyl-2,3-dicarbamate, 2-phenyl pentyl-2,3-dicarbamate and 3-phenyl pentyl-2,3-dicarbamate.

The foregoing dicarbamate compounds can be prepared readily from the corresponding monocarbamate compounds. For example, 1-phenyl ethyl-1,2-dicarbamate can be prepared from 2-hydroxy-2-phenyl ethyl carbamate. The intermediate monocarbamate will contain a hydroxyl group bonded to the same carbon atom as the phenyl group. Such monocarbamates can be prepared by the process described in application Ser. No. 816,700, filed May 29, 1959, now U.S. Patent No. 3,066,165. In the procedure of this application, a 1,2-glycol is converted to the corresponding carbonate, and the carbonate is subjected to ammonolysis to obtain the desired carbamate. Preferably, 1,2-glycol is condensed with a haloformic ester to obtain a cyclic carbonate which is then subjected to ammonolysis to obtain the monocarbamate. The intermediate monocarbamate can be converted to the dicarbamate by reaction with phosgene and ammonolysis. For example, the carbonyl chloride derivative can be reacted with diethyl aniline, and then with concentrated ammonium hydroxide. Since the particular process for preparing the dicarbamate compounds does not form a part of the present invention, it is not believed it will be necessary to further describe such processes herein, except as illustrated by the following examples.

In utilizing the compounds of this invention for central nervous system treatment and particularly to promote muscle relaxation, it is preferred to administer the compounds orally. Since the compounds are well-absorbed orally, it will usually not be necessary to resort to parenteral administration. For oral administration, it is preferred to combine the dicarbamate compounds with a pharmaceutical carrier. The proportions of the carrier and dicarbamate compound are not critical, and they vary considerably depending whether the composition is to be filled into capsules or formed into tablets. In tableting, it will usually be desirable to employ at least as much of the pharmaceutical carrier as the dicarbamate compound. Various edible pharmaceutical carriers, or mixtures thereof can be used. For example, a mixture of lactose, dibasic calcium phosphate, and cornstarch is suitable. Additional ingredients can be included, such as lubricants like magnesium stearate.

When administering the compounds of this invention orally for central nervous system treatment, the total daily dose will usually fall within the range from 400 to 2,000 milligrams of the dicarbamate compound per 24 hour period. Typically, the daily dose will range from 600 to 1,600 milligrams. In some cases, it may sometimes be desirable to administer as much as 2,400 milligrams per day. In practicing the method of this invention, it will therefore be convenient to have the dicarbamate compound combined with a pharmaceutical carrier, such as lactose, and prepared in tablets or other dosage unit form. Each tablet or dosage unit can contain from 50 to 600 milligrams of the dicarbamate compound. For example, tablets containing 200 milligrams of the dicarbamate compound can be administered either 1 tablet three times a day to achieve a daily dose of 600 milligrams or up to 2 tablets four times a day to achieve a daily dose of 1,600 milligrams.

The present invention is further illustrated by the following specific examples.

EXAMPLE I

The following method was utilized in preparing 2-hydroxy-2-phenyl ethyl carbamate:

A solution of 32.0 gms. (0.3 mole) of phosgene in 200 ml. of benzene was added dropwise to a stirred solution of 44.2 gms. of styrene glycol (0.3 mole) in 400 ml. of benzene. The solutions were maintained at a temperature of 30° C. during the addition.

The resulting reaction mixture was stirred for a period of 1 hour, whereafter 48.0 gms. of diethylaniline in 100 ml. of benzene was added and the mixture stirred for an additional hour. About 500 ml. of ice water was then added to the flask, and the benzene layer thereupon formed separated from the aqueous layer and washed with an additional 500 ml. of ice water.

To the benzene-soluble fraction was added 500 ml. of a 30% aqueous ammonium hydroxide solution, and thereafter the resulting mixture was maintained at a temperature of 5° C. for a period of 3 hours. Upon standing, needle-shaped crystals were formed, and such crystals were separated from the mother liquor. Crystallization can be facilitated by the removal of excess ammonia from the crystallization mixture under reduced pressure. The yield of crystal was 30 gms. An additional amount of reaction product was recovered from this mother liquor. The combined yield, after recrystallization from chloroform, was 40.5 gms. The melting point of the reaction product was 111–112° C.

This reaction product was subjected to analysis and the results were as follows:

Calculated: C, 59.65; H, 6.12; N, 7.73. Analyzed: C, 59.55, 59.75; H, 6.15, 6.17; N, 7.67, 7.54.

EXAMPLE II

The following method was utilized in the preparation of 1-phenyl ethyl-1,2-dicarbamate from 2-hydroxy-2-phenyl ethyl carbamate prepared as described in Example I.

A solution of 32.0 gms. (0.3 mole) of phosgene in 200 ml. of benzene was added dropwise to a stirred solution of 54.3 gms. of 2-hydroxy-2-phenyl ethyl carbamate (0.3 mole) in 400 ml. of benzene. The solutions were maintained at a temperature of 30° C. during the addition.

The resulting reaction mixture was stirred for a period of 1 hour, whereafter 48.0 gms. of diethylaniline in 100 ml. of benzene was added and the mixture stirred for an additional hour. About 500 ml. of ice water was then added to the flask, and the benzene layer thereupon formed separated from the aqueous layer and washed with an additional 500 ml. of ice water.

To the washed benzene layer was added 500 ml. of a 30% aqueous ammonium hydroxide solution, and thereafter the resulting mixture was maintained at a temperature of 5° C. for a period of 3 hours. The white precipitate thereupon formed was separated from the mother liquor and recrystallized from chloroform containing a minor portion of acetone. The yield of crystalline product was 10 gms. having a melting point of 166–7° C.

This reaction product was subjected to analysis and the results were as follows:

Calculated: C, 53.57; H, 5.36; N, 12.5. Analyzed: C, 53.59, 53.40; H, 5.56, 5.41; N, 12.54, 12.40.

EXAMPLE III 1-phenyl-1,2-propanediol, 15.2 g. (0.1 mole) was dissolved in 25 ml. of pyridine dried over NaOH. To this chilled solution with stirring was added, dropwise, 19.3 g. (0.11 mole) of phenyl chlorocarbonate in half an hour. Stirring was continued at room temperature for another two hours. Ether, 100 ml., and then ice cold water, 50 ml. were added. The ether layer was separated, washed with 50 ml. of cold hydrochloric acid twice, 50 ml. cold water once, 50 ml. of cold 10% NaHCO₃ twice, 50 ml. cold water once, and dried over anhydrous CaCl₂. The dried ether solution was poured into 100 ml. of anhydrous NH₃. The reaction mixture was stirred for three hours. Ammonia was then allowed to evaporated overnight.

The ether solution was washed with 50 ml. of water three times, 50 ml. of 5% NaOH twice, 50 ml. of water twice, and dried. After ether was stripped off, an attempt was made to recrystallize the residue from 3 liters of benzene. All would not go into solution. After cooling, a solid, 3.0 g., M.P. 213–17° was isolated by filtration. It was recrystallized from acetone to give 1,2-dicarbamyl-1-phenyl propane, M.P. 225–226°.

EXAMPLE IV

To a stirred solution of 176.6 g. of styrene glycol (1.28 mole) in 2400 ml. of benzene was added, dropwise, a solution of 128 g. of phosgene (1.2 mole) in 800 ml. of benzene. The temperature was maintained at 30° C. After the addition was completed, the reaction mixture was stirred for another hour. Diethylaniline 192 g. in 200 ml. of benzene was then added. After an additional hour of stirring, 2 liters of water was added. The benzene layer was separated and washed with water.

One fourth of this benzene solution which contained approximately 0.3 mole of the chlorocarbonate was placed in a three-necked flask, fitted with a mechanical stirrer, an additional funnel, and a condenser. While stirring at ice-bath temperature, 500 ml. of 40 percent dimethylamine was added. Stirring was continued for two hours. The reaction mixture was allowed to warm up to room temperature overnight.

The benzene layer was separated and evaporated under reduced pressure. The residual brown oil was distilled twice under reduced pressure to give an oil, 42 g. B.P. 130°/150 mg. yield 66 percent.

To a stirred solution of 21 g. of this oil in 200 ml. of benzene was added, gradually 15 g. of phosgene in 170 ml. of benzene. After thirty minutes, diethylaniline 19 g. was added slowly. Stirring was continued for two and one-half to three hours at room temperature. The reaction mixture was then cooled to 5° C. After it was washed with ice water, 170 ml. of 30 percent NH₄OH was added. The reaction mixture was stirred at 5° C. for one and one-half hours and left standing overnight at room temperature.

The aqueous layer was separated. Ammonia was removed under reduced pressure without applying external heat. A solid, 12.7 g. was isolated by filtration. After drying in a vacuum desiccator over CaCl₂ for twenty-four hours, the solid melted at 143–145° C. It was recrystallized from benzene and petroleum ether (20–40° C.) to give crystals, 11.7 g., of 2-(N,N-dimethyl carbamyloxy)-1-phenylethyl carbamate M.P. 149–150° C.

EXAMPLE V

Tablets for oral administration were prepared from 1-phenyl ethyl-1,2-dicarbamate. This compound was combined with a mixed pharmaceutical carrier in the ratio of 2 parts by weight of the dicarbamate compound per 3 parts of the pharmaceutical carrier. The mixed carrier contained dibasic calcium phosphate as the principal ingredient together with smaller amounts of lactose and 1 part of cornstarch. A small amount of magnesium stearate was also included.

The dicarbamate compound, the calcium phosphate, the lactose, and part of the magnesium stearate were blended and dry mixed until a uniform composition was obtained. This was formed into firm slugs no greater than ¼-inch thick. The slugs were then put through an oscillating granulator equipped with a 10 mesh screen. The cornstarch and a little more magnesium stearate was added at intervals while the slugs were being sized. The granulation was blended in a drum tumbler for 30 minutes. Following this, the granulation was compressed into tablets of 500 mg. per tablet containing 200 milligrams of the carbamate compound.

While in the foregoing specification this invention has been described in relation to certain preferred embodiments, and many details have been set forth for purpose of illustration, it will be apparent to those skilled in the art that the invention is susceptible to additional embodiments, and that certain of the details set forth herein can be varied considerably without departing from the basic principles of the invention.

We claim:
1. A composition in dosage unit form for providing muscle relaxation, comprising about 50 to 600 milligrams of a phenyl alkyl dicarbamate compound in admixture with a pharmaceutical carrier, said compound having the structural formula:

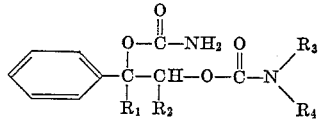

wherein $R_1$ is selected from the class consisting of hydrogen and an alkyl group containing from 1 to 3 carbon atoms, $R_2$ is selected from the class consisting of hydrogen and an alkyl group containing from 1 to 2 carbon atoms, and $R_3$ and $R_4$ are selected from the class consisting of hydrogen and methyl.

2. A composition according to claim 1 in which said compound has the structural formula:

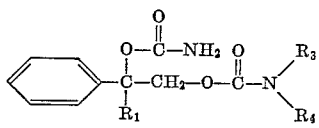

wherein $R_1$, $R_3$ and $R_4$ are as defined.

3. The composition of claim 1 wherein said compound is 1-phenyl ethyl-1,2-dicarbamate.

4. The composition of claim 1 wherein said compound is 1,2-dicarbamyloxy-1-phenyl-propane.

5. The composition of claim 1 wherein said compound is 2-(N,N-dimethyl carbamyloxy)-1-phenylethyl carbamate.

6. The method of providing muscle relaxation in an animal comprising orally administering to said animal an effective amount of a phenyl alkyl dicarbamate compound having the structural formula:

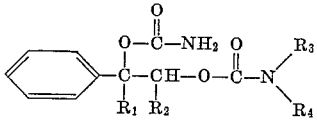

wherein $R_1$ is selected from the class consisting of hydrogen and an alkyl group containing from 1 to 3 carbon atoms, $R_2$ is selected from the class consisting of hydrogen and an alkyl group containing from 1 to 3 carbon atoms, and $R_3$ and $R_4$ are selected from the class consisting of hydrogen and methyl.

7. The method of claim 5 wherein said compound is 1-phenyl ethyl-1,2-dicarbamate.

8. The method of claim 5 wherein said compound is 1,2-dicarbamyloxy-1-phenyl-propane.

9. The method of claim 5 wherein said compound is 2-(N,N-dimethyl carbamyloxy)-1-phenylethyl carbamate.

10. The method of claim 5, comprising orally administering to said animal from 400 to 2,400 milligrams per 24 hour period of said phenyl alkyl dicarbamate compound.

11. The method of claim 10 wherein said compound is 1-phenyl ethyl-1,2-dicarbamate.

12. The method of claim 10 wherein said compound is 1,2-dicarbamyloxy-1-phenyl-propane.

13. The method of claim 10 wherein said compound is 2-(N,N-dimethyl carbamyloxy)-1-phenylethyl carbamate.

No references cited.

SAM ROSEN, *Primary Examiner.*